Dec. 27, 1960   E. R. OLSEN   2,966,382
WEAR-RESISTANT PISTON
Filed May 26, 1958
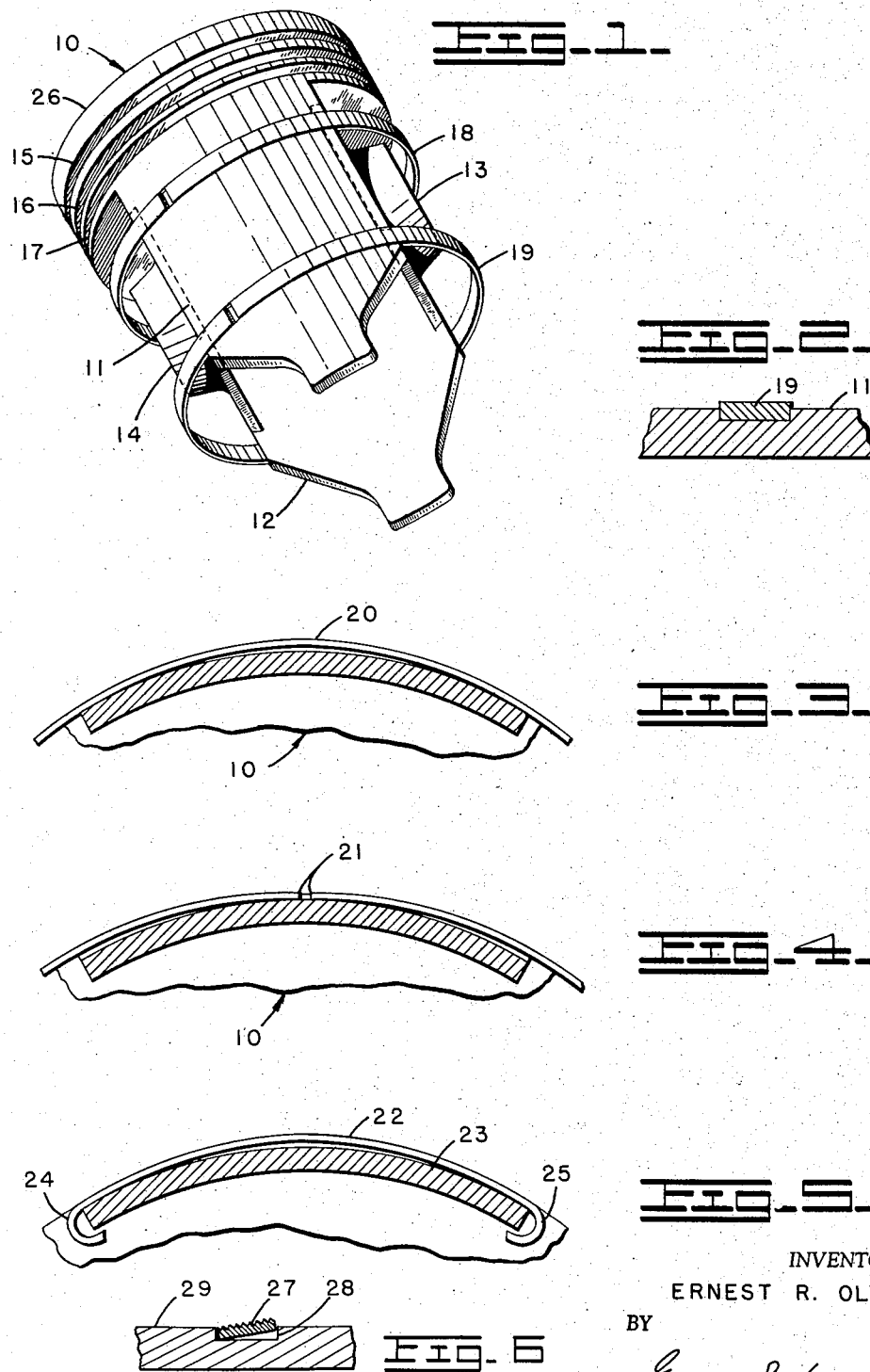
INVENTOR.
ERNEST R. OLSEN
BY

2,966,382
WEAR-RESISTANT PISTON

Ernest R. Olsen, 2241 Jefferson St.,
Muskegon Heights, Mich.

Filed May 26, 1958, Ser. No. 737,818

1 Claim. (Cl. 309—5)

This invention relates to the construction of pistons, the principle purpose being to increase the resistance of these engine elements to wear. To reduce the effects of vibration, it is common practice to construct pistons of relatively light materials such as aluminum, magnesium, and other related alloys. These alloys commonly exhibit rather poor bearing characteristics, and become subject to wear and abrasion to a rather high degree. This invention provides a modification of conventional piston construction which considerably increases the wear resistance without interfering with the possibility of using the light alloys. The invention also utilizes the inherent shape of the piston as a means of holding an auxiliary bearing member in position, and also provides for a relative configuration of the bearing member and piston which will establish a cushioning effect as the piston becomes subject to the periodic lateral forces encountered in the usual internal combustion engine. The several features of the invention will be analyzed in detail through a discussion of the particular embodiments illustrated in the accompanying drawing. In the drawing:

Figure 1 is a perspective view of a piston having a discontinuous skirt, with two bearing rings installed in the skirt section.

Figure 2 presents a section on an enlarged scale showing the installation of the bearing ring within an annular peripheral groove in the piston.

Figure 3 is a section taken on a plane parallel to the plane of the ring, and showing the position of the preferred form of the ring in the groove.

Figure 4 illustrates a section taken on a plane similar to that of Figure 3, but showing the portion where the ring is interrupted.

Figure 5 illustrates a modified form of the invention utilizing a ring segment embracing the discontinuous skirt of the piston.

Figure 6 shows a further modification which utilizes a ring deflecting under torsion to provide the resilient cushion.

Referring to Figure 1, the piston generally indicated at 10 has a pair of opposite skirt portions 11 and 12 which are separated by discontinuities in the substantially cylindrical surface of the piston. A pin is normally received in the portions 13 and 14 for engagement with the usual connecting rod. The upper grooves 15, 16, and 17 are provided for receiving the usual compression and oil-retention rings, which form no part of this invention.

To increase the resistance of the piston to wear, the auxiliary bearing rings 18 and 19 are positioned within appropriate peripheral grooves in the skirt portions 11 and 12. The thickness of these rings will normally be equal to or slightly in excess of the depth of the groove shown in Figure 2. The rings are formed preferably of a stainless steel, or of some material of similar bearing characteristics. When installed as shown in Figure 1, they provide considerable areas for the support of the piston against the walls of the cylinder so that the light alloy of which the piston is made can be relieved of the bearing pressure and abrasion.

Figure 3 illustrates a preferred formation of the ring with respect to the curvature of the piston, such that the rings tend to provide a resilient cushioning action as a result of the fact that the ring curvature is in excess of the curvature of the bottom of the grooves in which they are received. The central portion 20 of the ring will have a tendency to maintain itself at a position somewhat radially outward from the bottom of the groove through its own natural resilience, and the application of lateral pressure from the connecting rod which forces the piston against the cylinder wall will first encounter the ring resilience before "bottoming" the ring against the groove. This action, together with the friction of the ring as it works within the groove, will exert a dampening effect tending to minimize the violence of the piston oscillations against the cylinder wall. Figure 4 shows the opposite side of the piston from that of Figure 3, with the ring having a gap indicated at 21. The curvature of the ring is such that the ring tends to be naturally supported at the ends forming the gap, and at other positions around the periphery. It is contemplated that the free position of the ring as it is installed in the groove will follow a somewhat undulating configuration.

Referrring to Figure 5, a modified form of the invention is shown in which a relatively small ring segment 22 is utilized in place of the arrangements shown in Figures 1, 2, 3, and 4, which utilize a ring which is continuous except for a very small gap (as indicated at 21 in Figure 4). The segment 22 embraces the skirt portion 23 through the engagement of the formed ends 24 and 25 with the respective sides of the discontinuous skirt portion. The use of short segments of this type is necessary where clearance for the connecting rod movement is required between the skirt discontinuities. The arrangement shown in Figure 5 has the added advantage of eliminating the presence of a substantial cantilever section of ring subject to lateral frictional pressures, and also serves to position the bearing unit against peripheral slippage. In some applications, it becomes desirable to place a pin or some other similar obstruction within the gap 21 shown in Figure 4 to localize the position of the gap for proper control of the ring deflection.

Auxiliary bearing rings similar to that shown at 18 and 19 in Figure 1 are in position for the control of wear on the skirt area of the piston, and this same arrangement can be made to increase the resistance of the piston to wear in the upper area. The distance between the top of the piston 26 and the first groove 15 may be utilized for installing a bearing ring, which has the advantage of increasing the ability of the piston to support itself in an area where very little piston surface is available. The upper end of the piston has so much of its area removed as a result of the presence of the compression and oil-retention grooves 15—17 that a relatively small area is present to withstand the bearing pressures. The presence of a member having better bearing characteristics is very desirable. The same general arrangement shown in Figures 3 and 4 may be utilized in the installation of a ring near the top of the piston.

Figure 6 illustrates a use of ring resilience derived from torsional deflection to provide the cushioning effect. The ring 27 has a serrated outer periphery to assist in preventing oil movement toward the upper end of the cylinder. The ring 27 is of a material having good bearing and low friction characteristics (such as stainless steel), and is received in the groove 28 of the piston 29. The formation of the ring is such that when it is installed it exhibits a tendency to assume a flared condition as if it were a part of a substantially conical surface. As the piston is periodically crowded against the cylinder wall, the ring is forced down into the groove. This periodic resilient yielding provides the cushioning effect.

The particular embodiments of the present invention which have been illustrated and discussed herein are for illustrative purposes only and are not to be considered as a limitation upon the scope of the appended claim. In the claim, it is my intent to claim the entire invention disclosed herein, except as I am limited by the prior art.

I claim:

A piston having a discontinuous skirt and a peripheral groove in said skirt extending across the portions of said skirt defined by the discontinuity thereof, and a bearing ring segment engaging said groove and having greater free curvature than the bottom of said groove, said segment having end portions embracing at least one of said skirt portions, said ring segment having a thickness at least equal to the depth of said groove.

References Cited in the file of this patent

UNITED STATES PATENTS

| | | |
|---|---|---|
| 1,283,021 | Anderson | Oct. 28, 1918 |
| 1,441,082 | Heginbottom | Jan. 2, 1923 |
| 1,546,525 | Wasson | July 21, 1925 |
| 1,919,183 | Paton | Aug. 18, 1933 |
| 2,178,993 | Hill | Nov. 7, 1939 |
| 2,287,884 | Jominy | June 30, 1942 |
| 2,855,253 | Ayling | Oct. 7, 1958 |
| 2,867,482 | Schmidt | Jan. 6, 1959 |

FOREIGN PATENTS

| | | |
|---|---|---|
| 589,003 | Great Britain | June 9, 1947 |

OTHER REFERENCES

Automotive Engineer, pages 29–32, published January 1946.